(12) United States Patent
Decoux et al.

(10) Patent No.: US 11,932,418 B2
(45) Date of Patent: Mar. 19, 2024

(54) ELECTRONIC SYSTEM FOR CONTROLLING THE DOCKING OF A VEHICLE WITH A DOCKING AREA, AND CORRESPONDING METHOD

(71) Applicant: TLD EUROPE, Reffannes (FR)

(72) Inventors: Laurent Decoux, Tours (FR); Charles Besse, Tours (FR)

(73) Assignee: TLD EUROPE, Reffannes (FR)

( * ) Notice: Subject to any disclaimer, the term of this patent is extended or adjusted under 35 U.S.C. 154(b) by 485 days.

(21) Appl. No.: 17/267,581

(22) PCT Filed: Aug. 10, 2018

(86) PCT No.: PCT/FR2018/052059
§ 371 (c)(1),
(2) Date: Feb. 10, 2021

(87) PCT Pub. No.: WO2020/030857
PCT Pub. Date: Feb. 13, 2020

(65) Prior Publication Data
US 2021/0309387 A1    Oct. 7, 2021

(51) Int. Cl.
*G05D 1/02* (2020.01)
*B64F 1/32* (2006.01)
*G05D 1/00* (2006.01)

(52) U.S. Cl.
CPC ........... *B64F 1/326* (2020.01); *G05D 1/0225* (2013.01); *G05D 1/0251* (2013.01)

(58) Field of Classification Search
CPC ...... B64F 1/326; G05D 1/0225; G05D 1/0251
See application file for complete search history.

(56) References Cited

U.S. PATENT DOCUMENTS

| | | | | |
|---|---|---|---|---|
| 5,170,352 A | * | 12/1992 | McTamaney | ........ G05D 1/0242 318/587 |
| 8,935,049 B2 | | 1/2015 | Decoux et al. | |

(Continued)

FOREIGN PATENT DOCUMENTS

| | | |
|---|---|---|
| EP | 1464577 A1 | 10/2004 |
| EP | 3293121 A1 | 3/2018 |

(Continued)

*Primary Examiner* — Tye William Abell
(74) *Attorney, Agent, or Firm* — Harness Dickey & Pierce PLC (57) ABSTRACT

An electronic system and method controls automatic or semi-automatic docking of a vehicle with a given docking area, applicable, in particular, to the docking of an airport vehicle, such as a baggage belt loader, a catering vehicle, etc., to the fuselage of an aircraft, for example to the door of such an aircraft. The given docking area comprises at least one target. The system includes first determination device configured to determine the position of the docking area by determining the type of target from a set of given types and its position, second determination device configured to determine a guide path for guiding the vehicle towards the given docking area depending on the position of the docking area, and third determination device configured to determine the type of docking destination, the second determination device being capable of determining one or more exclusion areas depending on the type of docking destination, by comparing the type of docking destination with types of docking destination, stored in a database in association with exclusion areas, such that the guide path for guiding the vehicle towards the given docking area does not pass into any of the exclusion areas.

35 Claims, 4 Drawing Sheets

(56) References Cited

U.S. PATENT DOCUMENTS

| | | | |
|---|---|---|---|
| 9,085,374 B2 | 7/2015 | Decoux et al. | |
| 9,187,185 B2 | 11/2015 | Braier et al. | |
| 2005/0198750 A1* | 9/2005 | Spencer | B64F 1/3055 14/71.5 |
| 2012/0310482 A1* | 12/2012 | Decoux | B64F 1/227 414/427 |
| 2016/0054443 A1* | 2/2016 | Mallaghan | G08G 5/06 701/519 |
| 2018/0074473 A1* | 3/2018 | Truscott | G05B 19/042 |

FOREIGN PATENT DOCUMENTS

| | | |
|---|---|---|
| FR | 2830239 A1 | 4/2003 |
| FR | 2956381 A1 | 8/2011 |
| FR | 3017368 A1 | 8/2015 |
| FR | 3017848 A1 | 8/2015 |
| WO | WO-2014-154860 A1 | 10/2014 |
| WO | WO-2017-137241 A1 | 8/2017 |
| WO | WO-2017137241 A1 * | 8/2017 |

* cited by examiner

ELECTRONIC SYSTEM FOR CONTROLLING THE DOCKING OF A VEHICLE WITH A DOCKING AREA, AND CORRESPONDING METHOD

CROSS-REFERENCE TO RELATED APPLICATION

This application is a National Phase entry of International Application No. PCT/FR2018/052059, filed Aug. 10, 2018, which is incorporated by reference herein.

BACKGROUND AND SUMMARY

The present invention relates to an electronic system for controlling the automatic or semi-automatic docking of a vehicle at a docking zone. It finds application in particular to the docking of an airport vehicle, commonly designated by the abbreviation GSE (Ground Support Equipment), to the fuselage of an aircraft. This can for example be a baggage belt loader, a catering vehicle, etc.

These airport vehicles provide service to the aircraft, particularly airplanes, on the service area of airports between two flights, and are therefore required to maneuver in their immediate proximity. Certain of these vehicles are required to dock with the aircraft, which is the case in particular with baggage belt loaders for airplanes.

It is important however to prevent these vehicles from coming into contact too abruptly with the fuselage of the aircraft, so as not to damage it.

In order to secure the docking of vehicles to aircraft, procedures are provided, which provide for example limiting the speed of the vehicle upon approaching the aircraft, for the purpose of reducing or eliminating any risk of damage to the fuselage of the aircraft in the case of accidental contact.

The docking maneuver therefore requires great precision, not only to avoid damaging the aircraft as explained above, but also to guarantee the correct implementation of the function provided by the service vehicle, such as the function of loading baggage into the aircraft.

One of the objects of the invention is therefore to solve in particular the aforementioned problems. Thus, the invention has particularly as its goal to propose a system and a method of controlling the docking of a vehicle to a docking zone, automatically or semi-automatically, allowing precise and secure docking.

The invention thus has as its object, according to a first aspect, an electronic system for controlling the docking of a vehicle, such as an airport vehicle, at a given docking zone of a docking destination such as an aircraft or a building, for example a door of an aircraft, the given docking zone comprising at least one target, the system comprising first determination means configured to determine the position of the docking zone by determining the type of the target from a set of given types and from its position, second determination means configured to determine a guidance trajectory of the vehicle to the given docking zone depending on the position of said docking zone, and third determination means configured to determine the type of the docking destination, the second determination means being able to determine one or more exclusion zones depending on the type of the docking destination, by comparison of the type of the docking destination with types of docking destination stored in a database in association with exclusion zones, so that the guidance trajectory of the vehicle to the given docking zone does not pass into any of said exclusion zones.

According to certain embodiments, the system also comprises one or more of the following features, taken alone or according to any technically possible combination:

the given docking zone being a docking zone of a docking destination such as an aircraft or a building, the first determination means are able to determine a three-dimensional representation of the docking destination, and to perform one or more measurements in the three-dimensional representation to determine the position of the docking zone;

the first determination means are able to compare the measurements with measurements stored in a database, to deduce from them the contour of the docking zone and its position relative to at least one other zone of the docking destination;

the given docking zone comprises at least one target, the first determination means being configured to determine the type of the target from a set of given types, and its position, and the guidance trajectory depending on the type and on the position of the target;

the first determination means are able to determine the size and/or the shape of the target, to compare the determined size and/or shape with sizes and/or shapes stored in a database in association with types of target also stored in said database, to deduce from them the type of the target;

the first determination means comprise a two-dimensional vision device able to determine the size and/or the shape of the target and means for determining the distance between the first determination means and the target;

the means for determining the distance comprise a three-dimensional vision device or a distance sensor such as a laser, ultrasonic or radar sensor;

the first determination means comprise a first two-dimensional vision device able to determine the size and/or the shape of the target and a second two-dimensional vision device, so as to allow the determination of the distance between the first determination means and the target by triangulation;

the given docking zone being a docking zone of a docking destination such as an aircraft or a building, and the system comprises third determination means configured to determine the type of the docking destination and/or the type of the docking zone;

the third means of determining the type of the docking destination are able to determine one or more parameters, among the size and the relative position, of at least two principal parts of the docking destination, and to compare the value of the parameter(s) with parameter values stored in a database and associated with types of docking destinations also stored in said database, to deduce from them the type of the docking destination;

the docking destination is an aircraft and the given docking zone is a door of the aircraft, and the type of aircraft stored in the in the database associated with parameter values also stored in the database comprises the make of the aircraft, the type of the aircraft within the make, and the version of the aircraft within the type;

the second determination means are able to determine a docking line passing through a point situated on the surface of the docking zone and perpendicular to this surface, so that the guidance trajectory of the vehicle to the docking zone is terminated by a final portion of said docking line with a length greater than or equal to a predetermined threshold, preferably greater than or equal to 2 meters;

the second determination means are able to measure the alignment between the vehicle and the docking zone by analysis of at least a part of the profile of the docking destination, such as the fuselage line of the aircraft, in proximity to the target, and to determine the point depending on the type of the docking destination and/or the docking zone;

the given docking zone comprises at least two targets, and the point is located at equal distances from said targets;

the second determination means are able to determine the trajectory for reaching the final portion of the docking line by adjusting said trajectory at different predetermined moments, in order, at each of said moments:

to align the rear suspension of the vehicle with the docking line in the case where said vehicle is located at a distance greater than a given distance from the docking line;

to align the front suspension of the vehicle with the docking line in the case where said vehicle is located at a distance less than the given distance from the docking line;

to retain the trajectory determined at the preceding moment, if the confidence level in locating the targets determined by the first determination means is less than a given threshold, or if the first determination means no longer detect the targets;

the distance between the vehicle and the docking line is measured from the center of the rear suspension of the vehicle;

the second determination means are able to adjust the trajectory at each of the predetermined moments, and in the case where the vehicle is located at a distance greater than the given distance from the docking line, by:

determining a target point on the docking line;

defining a trajectory to allow the vehicle to reach the target point;

the determination of the target point depends on the longitudinal distance between the vehicle and the docking zone, on the lateral distance between the vehicle and the docking line, and the angle between the longitudinal axis of the vehicle and the docking line.

the longitudinal distance between the vehicle and the docking zone is measured from the center of the rear suspension of the vehicle;

the lateral distance between the vehicle and the docking line is measured from the center of the rear suspension of the vehicle;

the trajectory to allow the vehicle to reach the target point forms a circular arc extending from the center of the rear suspension of the vehicle to the target point and with a radius determined by the formula $(X^2+Y^2)/(2\times Y)$, with X and Y corresponding to the coordinates of the target point relative to the center of the rear suspension of the vehicle;

the second determination means are able to adjust the trajectory at each of the predetermined moments, and in the case where the vehicle is located at a distance less than the given distance from the docking line, by orienting the wheels of the front suspension of the vehicle at an angle depending on the distance between the center of said front suspension and the docking line.

According to a second aspect, the invention also has as its object a vehicle, such as an airport vehicle, comprising rolling means able to allow the movement of the vehicle by rolling, steering means able to allow orienting the movement in a given direction, and an electronic docking control system as presented above, the rolling means being connected by the steering means to the control system, so as to allow the guidance of the vehicle on the trajectory determined by the second determination means of said control system.

In one embodiment, the rolling means comprise a front suspension, and the control system is connected to the rolling means by the steering means so as to allow guidance of the vehicle by control of the front suspension.

According to a third aspect, the invention also has as its object a method for controlling the docking of a vehicle, such as an airport vehicle, at a given docking zone, of a docking destination such as an aircraft or a building, for example a door of an aircraft, the given docking zone comprising at least one target, the method comprising a first step of determining the position of the docking zone by determining the type of target from a set of given types and from its position, a second step of determining a guidance trajectory of the vehicle to the docking zone depending on the position of said docking zone, and a third step of determining the type of the docking destination, the second determination step comprising the determination of one or more exclusions zones depending on the type of docking destination, by comparison of the type of the docking destination with types of docking destinations stored in a database in association with exclusion zones, so that the guidance trajectory of the vehicle to the given docking zone does not pass into any of said exclusion zones.

According to certain embodiments, the method also comprises one or more of the following features, taken in isolation or according to all technically possible combinations the docking zone is a docking zone of a docking destination and, during the first determination step, a three-dimensional representation of the docking destination is determined and one or more measurements are performed in said three-dimensional representation, to determine the position of the docking zone;

during the first determination step, the measurements are compared with measurements stored in a database, to deduce from them the contour of the docking zone and its position relative to at least one other zone of the docking destination;

the docking zone comprises at least one target and, during the first determination step, the type of the target is determined from a set of determined types and its position, and the guidance trajectory determined during the second determination step depends on the type and on the position of the target;

during the first determination step, the size and/or the shape of the target is determined, the determined size and/or shape are compared with the sizes and/or shapes stored in a database in association with types of target also stored in said database, to deduce from them the type of the target;

the docking zone is a docking zone of a docking destination such as an aircraft or a building, and the method comprises a third step of determining the type of the docking destination and/or of the docking zone;

during the third determination step, one or more parameters are determined among the size and the relative position, of at least two principal parts of the docking destination, and the value of the parameter(s) is compared with parameter values stored in a database and associated with types of docking destination also stored in said database, to deduce from them the type of the docking destination;

the docking destination is an aircraft and the docking zone is a door of the aircraft, the type of aircraft stored in the database associated with values of parameters also stored in the database comprising the make of the aircraft, the type of aircraft within the make, and version of the aircraft within the type;

during the second determination step, a docking line passing through a point situated on the surface of the docking zone and perpendicular to this surface is determined, so that the guidance trajectory of the vehicle to the docking zone is terminated by a final portion of the docking line with a length greater than or equal to a predetermined threshold, preferably greater than or equal to 2 meters;

during the second determination step, the alignment between the vehicle and the docking zone is measured by analysis of at least a part of the profile of the docking destination, such as the fuselage line of the aircraft, in proximity to the target;

the docking zone comprises at least two targets, the point being located at equal distances from said targets;

during the second determination step, the trajectory for reaching the final portion of the docking line is determined by adjusting said trajectory at different predetermined moments, in order, at each of said moments:
  to align the rear suspension of the vehicle with the docking line in the case where said vehicle is located at a distance greater than a given distance from the docking line;
  to align the front suspension of the vehicle with the docking line in the case where said vehicle is located at a distance less than the given distance from the docking line;
  to retain the trajectory determined at the preceding moment if the confidence level in locating the targets during the first determination step is less than a given threshold, or if the targets are no longer detected;

the distance between the vehicle and the docking line is measured from the center of the rear suspension of the vehicle;

during the second step, at each of the predetermined moments, and in the case where the vehicle is located at a distance greater than the given distance of the docking line, the trajectory is adjusted by:
  determining a target point on the docking line;
  defining a trajectory to allow the vehicle to reach the target point;

the determination of the target point depends on the longitudinal distance between the vehicle and the docking zone, on the lateral distance between the vehicle and the docking line, and on the angle between the longitudinal axis of the vehicle and the docking line;

the longitudinal distance between the vehicle and the docking zone is measured from the center of the rear suspension of the vehicle;

the lateral distance between the vehicle and the docking line is measured from the center of the rear suspension of the vehicle;

the trajectory for allowing the vehicle to reach the target point forms a circular arc extending from the center of the rear suspension of the vehicle to the target point and with a radius determined by the formula $(X^2+Y^2)/(2\times Y)$, with X and Y corresponding to the coordinates of the target point relative to the center of the rear suspension of the vehicle;

during the second determination step, at each of the predetermined moments, and in the case where the vehicle is located at a distance less than the given distance to the docking line, the trajectory is adjusted by orienting the wheels of the front suspension of the vehicle at an angle depending on the distance between the center of said front suspension and the docking line.

Thus, the automatic or semi-automatic guidance of the vehicle equipped with the system of the invention allows precise and secure docking to the fuselage of the aircraft, and an effective implementation of the function provided by the vehicle.

The system determines the best trajectory for docking with the aircraft and guides the vehicle accordingly.

BRIEF DESCRIPTION OF THE DRAWINGS

The features and advantages of the invention will appear upon reading the description that follows, given solely by way of an example, and not limiting, with reference to the following appended drawings.

DETAILED DESCRIPTION

Figure 1:
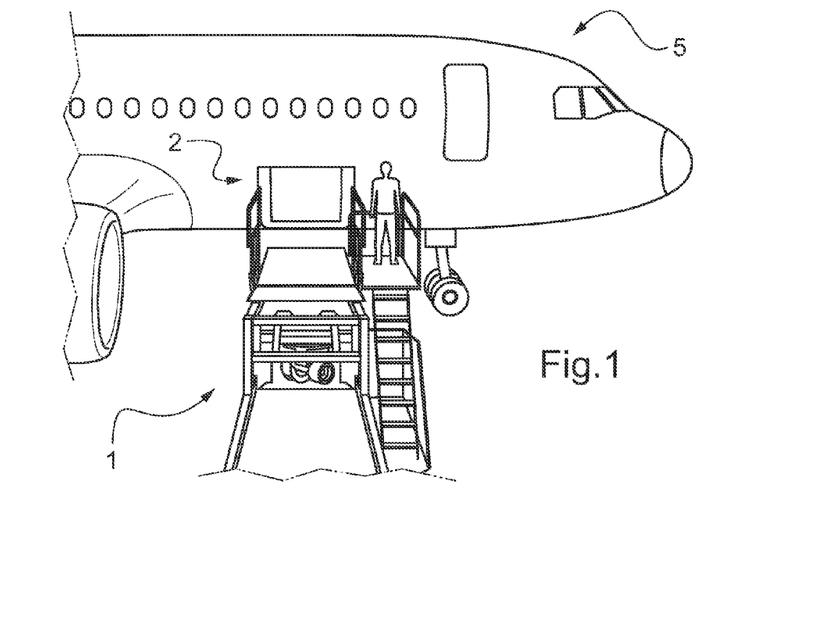
FIG. 1 is a schematic view of an example of a vehicle, in this case an airport vehicle, during docking to a docking destination, in this case an aircraft.

Shown in FIG. 1 is an example of an airport vehicle 1 which is a container loader, during docking to a docking zone 2, which is a door 2 of an aircraft 5, which is an airplane 5.

The vehicle 1 is equipped with the docking control system of the invention, and moves due to the rolling means, typically one or more wheel suspensions (not shown in FIG. 1), controlled by steering means allowing orienting the movement of the rolling means in a given direction.

The rolling means are connected by steering means to the control system, to allow the guidance of the vehicle 1 on the determined trajectory [by] the control system, as will be explained hereafter in an exemplary embodiment and implementation modality.

Figures 7, 8:
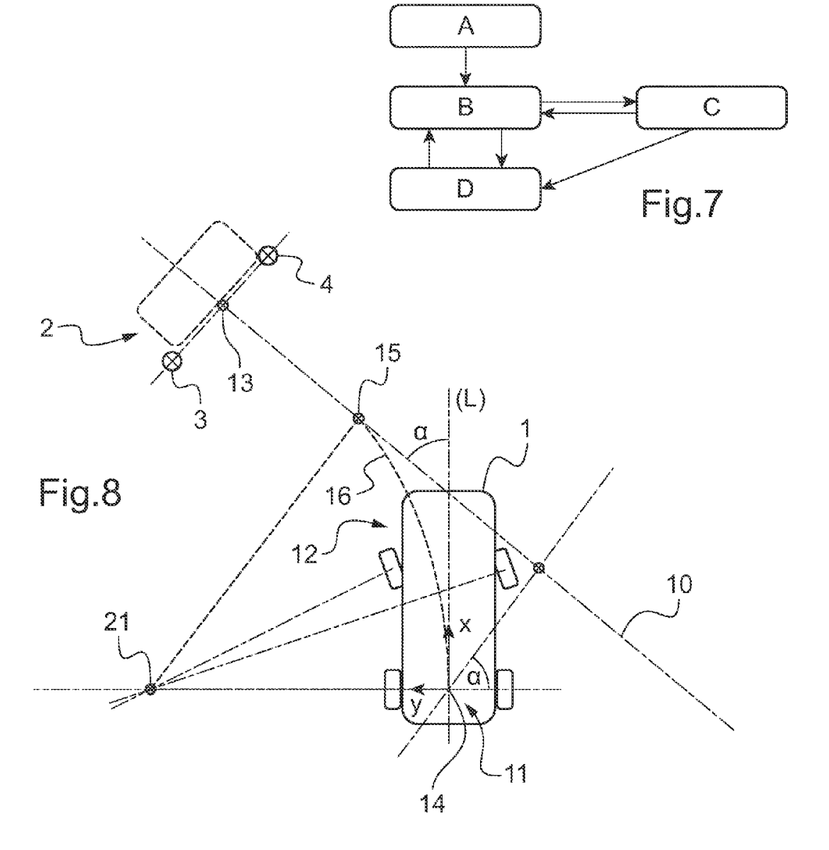
FIG. 7 is a schematic view of an example of a programmable logic controller corresponding to the operation of the second determination means of the control system of the invention.
FIG. 8 is a schematic view of a first type of trajectory adjustment by the second determination means of the control system of the invention.
Figure 9:
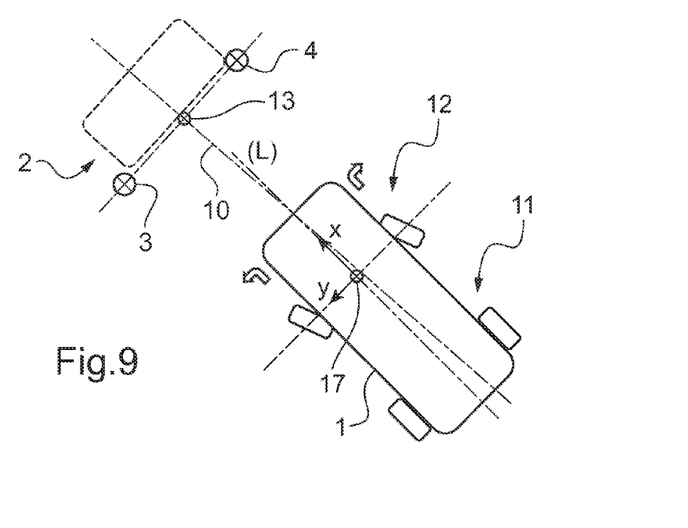
FIG. 9 is a schematic view of a second type of trajectory adjustment by the second determination means of the control system of the invention.

As will be seen hereafter in more detail relative to FIGS. 8 and 9, the rolling means 11, 12 comprise in particular a front suspension 12. The control system is connected to the rolling means 11, 12 by steering means so as to allow the guidance of the vehicle by control of this front suspension 12.

Figure 6:
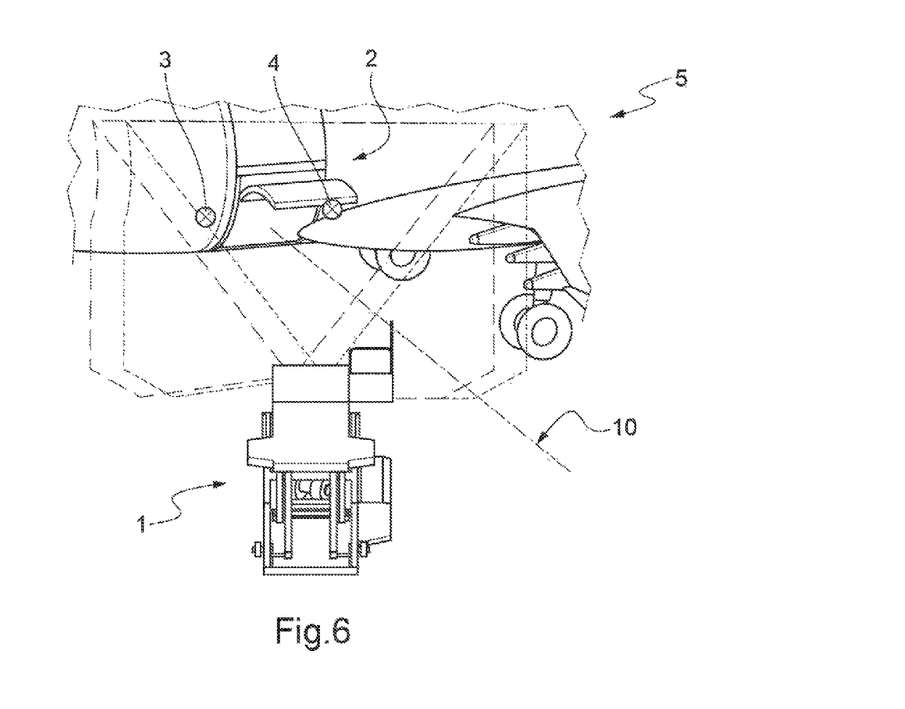
FIG. 6 is a schematic view of the determination of targets and of the docking line by the system and the method of the invention.

As will be seen more precisely in FIG. 6 in one exemplary embodiment, the docking zone 2 of the aircraft 5 is equipped with one or more targets 3, 4, in this case two targets 3, 4.

Targets 3, 4 of this type can for example be embedded in or painted on the fuselage of the aircraft 5.

The control system of the invention comprises the first determination means, which are configured to determine the type of the target(s) 3, 4 from a set of given target types. These determination means are also configured to determine the position of each of the targets 3, 4.

Moreover, the control system comprises second determination means, which are configured to determine a guidance trajectory of the vehicle 1 to the docking zone 2, depending on the type and on the position of the target(s) 3, 4.

To recognize the type of the targets 3, 4, the first determination means are able to determine the size and/or the shape of the targets 3, 4 and to compare this size and/or this shape with sizes and/or shapes stored in a database, on-board or remote. These shapes and sizes of targets are stored in the database in association with types of target also stored in this database.

Thus, by comparing the characteristics of a given target 3, 4 with characteristics stored in a database, the first determination means deduce the type of the given target 3, 4.

Figure 2:
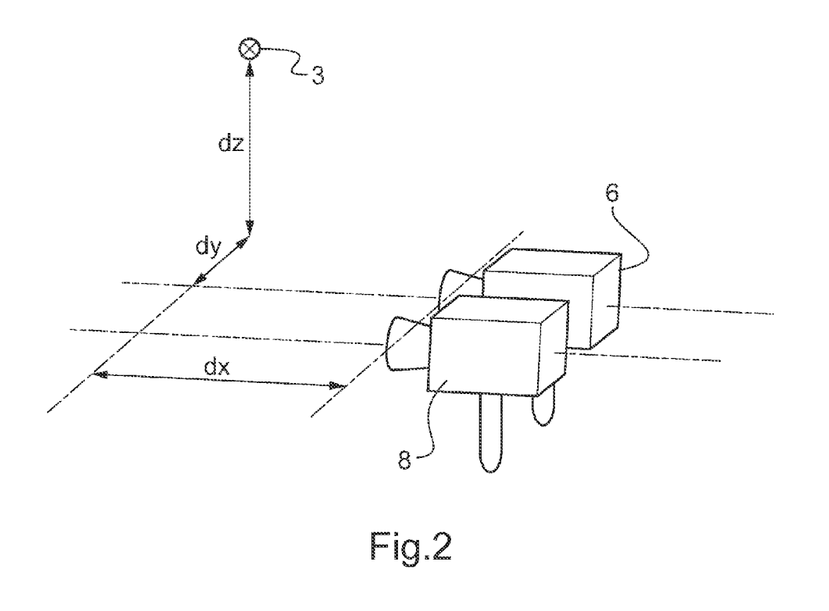
FIG. 2 is a schematic view of a part of the first determination means of the control system of the invention, according to a first example.
Figure 3:
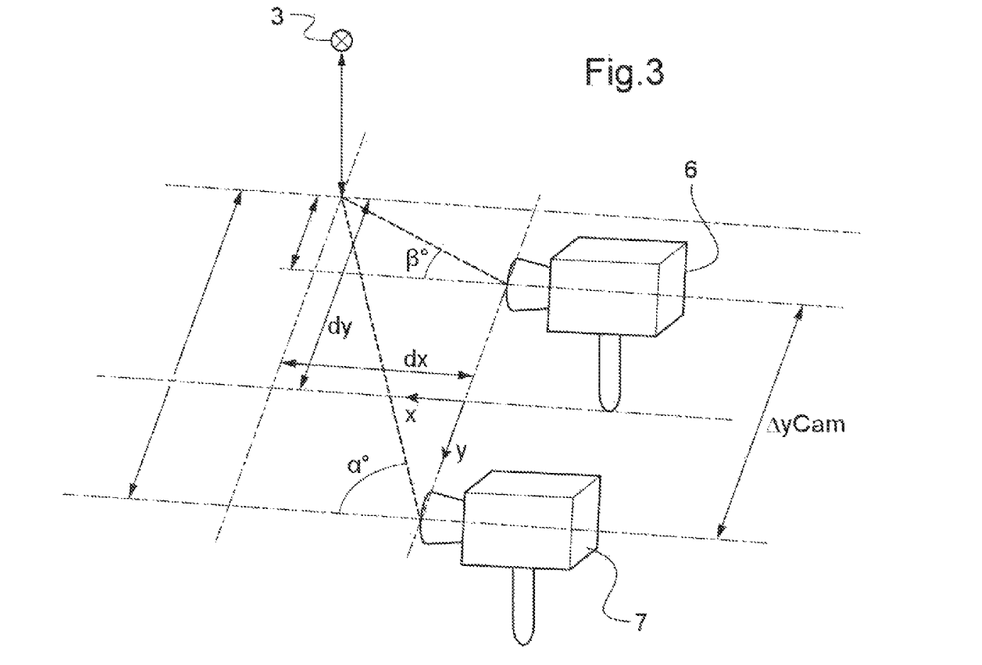
FIG. 3 is a schematic view of a part of the first determination means of the control system of the invention, according to a second example.

The first determination means comprise a two-dimensional vision device 6, shown in two examples in FIGS. 2 and 3. This two-dimensional vision device 6 is able to determine the size and/or the shape of the target 3, 4 in two first directions dy, dz.

Moreover, the first determination means comprise means 7,8 for determining the distance dx between the first determination means themselves and the target 3, 4, also shown in the two examples of FIGS. 2 and 3 respectively.

In the example of FIG. 2, the means 8 for determining the distance dx comprise a three-dimensional vision device 8 or a distance sensor, which can for example be a laser sensor, an ultrasonic sensor or a radar.

Alternatively, in the example of FIG. 3, the distance dx between the first determination means and the target 3, 4 is obtained by triangulation, based on the first two-dimensional vision device 6 and the second two-dimensional vision device 7.

The control system of the invention can also comprise third determination means configured to determine the type of the docking destination 5, whether this docking destination 5 is an airplane 5 or a building. For example, in the case of an airplane 5, these third determination means allow determining the type of the airplane 5, particularly its make, its type within the make, and its version within the type.

Moreover, the second determination means are also able to determine one or more exclusion zones depending on the type of the docking destination, in this case the airplane 5 in our example, to ensure that the guidance trajectory of the vehicle 1 to the docking zone 2 does not pass into any of these exclusion zones.

To this end, the third determination means determine one or more parameters of at least two principal parts of the airplane 5. This or these parameter(s) can be the size and/or the position relative to these principal parts of the airplane 5.

The third determination means then compare the value of the parameter(s) with values of these parameters stored in a database, on-board or remote. These parameter values are stored in the database in association with type of airplane 5. Thus, by comparing the values of the determined parameters with the parameter values stored in the database, the third determination means deduce the type of airplane 5.

For example, the shape of the airplane 5 can be analyzed. From this analysis, the position and the size relative to certain principal parts of the airplane 5 (such as the engines, the wings, the doors) are deduced, which are compared to values stored in the database.

The type selected in the database will be that for which the number of information items measured, compared with the values stored in the database for the type in question, is a maximum.

Alternatively, the type of the airplane 5 can be obtained from an RFID type marker read by an appropriate reader (or by any other wireless communication means appropriate to the type of the marker).

Also alternatively, an identifier of the airplane 5 allows an operator to know directly the model and the type of the airplane 5, information which can then be entered by the operator into the system.

The exclusion zones can also depend on the sequence of operations on the ground, for the purpose of optimizing the definition of the trajectory and to avoid interference with other equipment or devices involved in the ground assistance of the airplane 5.

To determine the different tasks of the operations on the ground, it is possible to use the determination means presented above to automatically recognize the type and the position of the devices and equipment involved, which will be compared with the information relating to the door to which the docking must take place.

The type of the equipment and devices in question can also be determined by means of reading an RFID type marker (or other type of marker readable at a distance by wireless reading means).

It is also possible to use an identifier for the equipment and devices in question, entered by an operator into the system.

It is also possible to use a predefined sequence of ground operations. In this case, the sequence is already defined, and a new device or piece of equipment arriving in the zone knows that other devices are in the zone, depending on its position in the time sequence of operations. This predefined operation sequence is stored for example in the vehicle, in a database of ground operation sequences.

This allows taking into account the sequence of operation in progress, the operation in progress, and the type of airplane 5, by using the ground operation sequences database, depending on the door to which the docking must take place.

Figure 4:
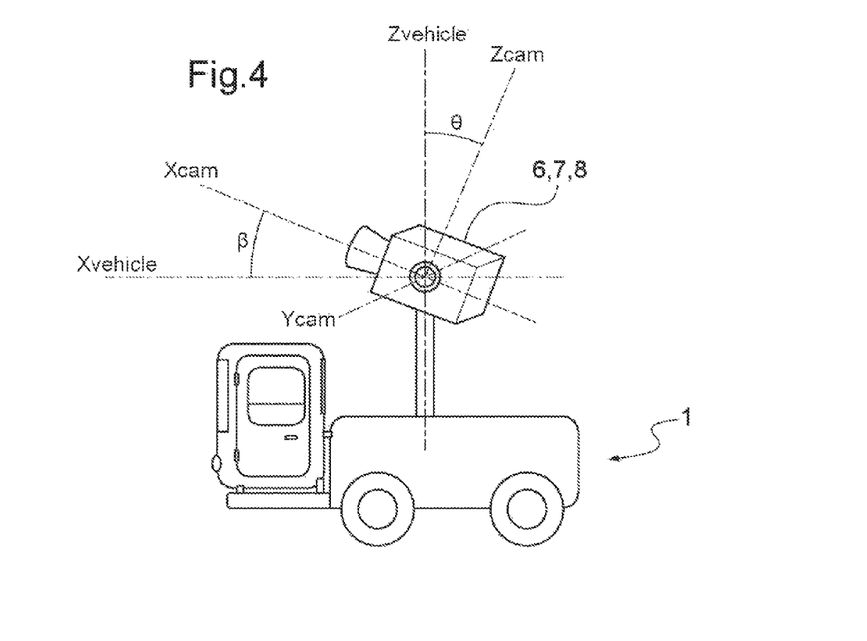
FIG. 4 is a schematic view of a part of the first determination means mounted on a vehicle, in an example intended to increase the vertex angle of the determination cone.
Figure 5:
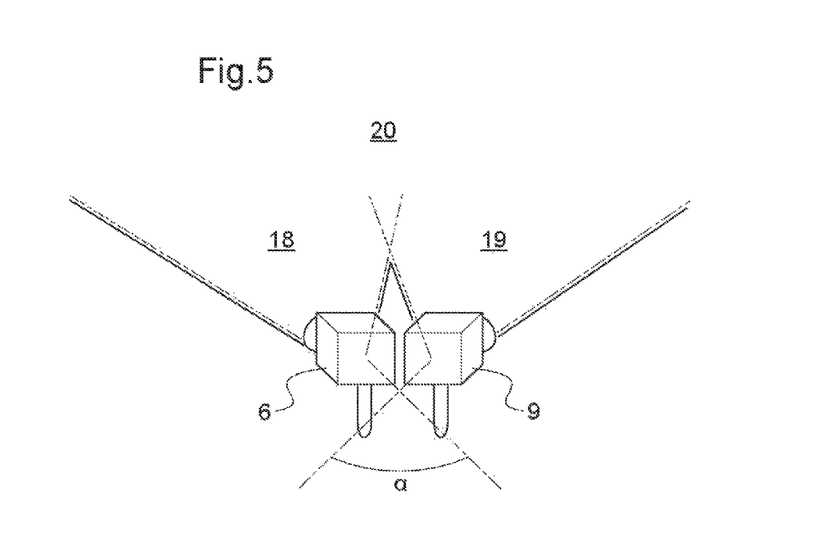
FIG. 5 is a schematic view of a part of the first determination means, in another example intending to increase the vertex angle of the determination cone.

As shown in FIGS. 4 and 5, it is possible to provide means allowing increasing the viewing angle of the first determination means, in particular of the two-dimensional vision device 6.

In the example shown in FIG. 4, the two-dimensional vision device 6, like the means 7, 8 for determining the distance dx between the first determination means themselves and the target 3, 4, are mounted on the vehicle 1 by means of a mechanism movable in rotation in at least two perpendicular planes, oriented in the direction of the door 2 of the airplane 5.

Depending on the position of each of the targets 3, 4 in the coordinate system of the two-dimensional vision device 6, the position of this device 6 is adjusted in real time to point to the middle of the two targets 3, 4.

Moreover, the position of the device 6 relative to the vehicle 1 is also measured to determine the relative position of the airplane 5 relative to the vehicle 1.

In the example shown in FIG. 5, the two-dimensional vision device 6 can be combined with another two-dimensional vision device 9. The gap between the two devices 6 and 9 (position and alignment) is determined, and the respective fields of vision 18 and 19 of the two devices 6 and 9 are combined into an extended field of vision 20.

These two exemplary embodiments thus allow increasing the viewing angle of the two-dimensional vision device 6 of the first determination means. In fact, from the point of view of the second determination means, the angle between the vehicle 1 and the docking line 10, shown hereafter particularly with reference to FIG. 6, is not limited to the field of vision of the two-dimensional vision device 6 alone. This allows increasing the capacity of the system of the invention by making it capable for example of introducing tight turns into the determined guidance trajectory.

As shown in particular in FIG. 6, in an example of docking to the door 2 of an airplane 5, the door being provided with two targets 3, 4, the second determination means are able to determine a docking line 10. This docking line is the line passing through the point 13 located at equal distances from the two targets 3, 4 on the surface of the docking zone 2 and perpendicular to this surface.

The guidance trajectory of the vehicle 1 to the docking zone 2 calculated by the system of the invention is then determined so that it is terminated by a final portion of the docking line 10. The length of this final portion is greater than or equal to a predetermined threshold, preferably greater than or equal to 2 meters. This guarantees that the vehicle 1, guided by the system of the invention, reaches the docking line 10 at least two meters before the fuselage of the airplane 5.

Then, once the docking line 10 is reached by the vehicle 1, a driver can for example take over to manually drive the vehicle to the docking zone 2 at very low speed.

As shown schematically by the programmable logic controller shown in FIG. 7, the second determination means are able to determine the trajectory to reach the final portion of the docking line 10, by adjusting this trajectory at different predetermined moments.

After the initialization of guidance from state A, the system passes into state B and verified whether the vehicle 1 is located at a distance greater than a given distance from the docking line 10. If that is the case, the second determination means adjust the trajectory in order to align the vehicle 1 with the docking line 10, i.e. to align the rear suspension 11 of the vehicle 1 with the docking line 10.

This operation of adjustment of the trajectory in order to align the vehicle 1 with the docking line 10 is repeated at intervals as long as the vehicle 1 is located at a distance greater than a given distance from the docking line 10.

This operation is shown schematically in more detail in FIG. 8. A target point 15 is determined on the docking line 10, and a trajectory 16 allowing the vehicle 1 to reach the target point 15 is determined. This target point 15 therefore corresponds to the point of the docking line 10 at which the vehicle 1 seeks to intercept this docking line 10.

The determination of the target point 15 depends on the longitudinal distance between the vehicle 1 and the docking zone 2, on the lateral distance between the vehicle 1 and the docking line 10, and on the angle α between the longitudinal axis L of the vehicle 1 and the docking line 10.

The lateral distance between the vehicle 1 and the docking line 10 is measured from the center 14 of the rear suspension 11 of the vehicle 1.

The longitudinal distance between the vehicle 1 and the docking zone 2 is measured, for its part, from the center 14 of the rear suspension 11 of the vehicle 1.

As shown in FIG. 8, the trajectory 16 to allow the vehicle 1 to reach the target point 15 forms a circular arc 16. This circular arc 16 extends from the center 14 of the rear suspension 11 of the vehicle 1, and runs until the target point 15. The radius of this circular arc is determined by the formula $(X^2+Y^2)/(2 \times Y)$, in which X and Y correspond to the coordinates of the target point 15 relative to the center 14 of the rear suspension 11 of the vehicle 1.

As can be seen schematically in this FIG. 8, to follow the circular arc 16 trajectory the wheels of the front suspension 12 are oriented with the axis perpendicular to the direction of each of these wheels and passing through the center of these wheels, pass through the center 21 of the circle which supports the circular arc 16 trajectory.

When the second determination means determine that the vehicle 1 is near being aligned with the docking line 10, i.e. when the vehicle 1 is located at a distance less than the given distance from the docking line 10, the system passes into state C shown in FIG. 7.

The second determination means then seek to align the vehicle 1 with the docking line 10 more finely, i.e. to align the front suspension 12 of the vehicle 1 with the docking line 10.

This operation is shown schematically in more detail in FIG. 9. The second determination means align the front suspension 12 of the vehicle 1 by an angle with depends on the distance between the center 17 of this front suspension 12 and the docking line 10.

From state B or state C, the system can pass into state D, called the "dark mode," when the confidence level in locating the targets 3, 4, determined by the first determination means, is less than a given threshold, or when the first determination means no longer detect the targets 3, 4.

In this case, the second determination means decide to retain the trajectory determined at the preceding moment.

The position of the targets can then be estimated by measuring the trajectory of the vehicle by means of an odometer and the angle of the front wheels. The trajectory of the vehicle is then recalculated relative to the estimated position of the targets.

Thus, to summarize, at each predetermined moment, the second determination means proceed with an adjustment of the trajectory of the vehicle 1 to reach the docking line.

First and foremost, if and as long as the rear suspension 11 of the vehicle 1 is not near being aligned with the docking line 10, within the meaning explained above, an adjustment of the rear suspension 11 is implemented (state B in FIG. 7, and exemplary implementation in FIG. 8).

A soon as the rear suspension 11 is near being aligned with the docking line 10, within the meaning explained above, if and as long as the front suspension 12 is not considered to be aligned with the docking line 10, a finer adjustment is implemented, by aligning the front suspension 12 with the docking line 10 (state C in FIG. 7, and exemplary implementation in FIG. 9).

At each moment, whether in state B or in state C, the system verifies whether the confidence level in locating the targets 3, 4, determined by the first determination means, is greater than a given threshold, and whether the first determination means still detect the targets 3, 4. If this is not the case, the second determination means retain the trajectory determined at the preceding moment without adjusting it.

For an airport vehicle 1 fulfilling a particular function by means of a particular tool, such as loading baggage by means of a belt loader, it is also possible to provide that the system of the invention comprise means allowing measuring the distance between the tool in question and the docking zone 2, and its height relative to the docking zone. This measurement can in particular be obtained by triangulation from the location of the targets 3, 4, by means of the devices 6, 7, 8 shown above relative to the first determination means.

When the vehicle 1 is stopped, in position in front of the docking zone 2, after guidance along the trajectory determined by the system of the invention, the position of the tool can thus be automatically adjusted.

The system of the invention is an electronic system intended to be carried on board the vehicle 1, comprising one or more memories for storing information, and one or more units for processing this information, allowing the implementation of the functions of the first, second and third determination means.

The embodiments presented above relate to the determination, by the second determination means, of the guidance trajectory of the vehicle 1 to the docking zone 2 depending on the position of the docking zone 2 determined by the first determination means, by determining the type and the position of one or more targets 3, 4 associated with the docking zone 2.

A more detailed example is given earlier regarding the user of at least two targets 3 and 4.

Another variant exists with the sue of a single target 3 or 4 associated with the docking zone 2. In this case, the second determination means measure the alignment between the vehicle 1 and the docking zone 2 by analyzing at least one part of the profile of the docking destination 5, i.e., in the case of an aircraft 5, the line of the fuselage of this aircraft 5. The point 13, situated on the surface of the docking zone 2, from which the docking line 10 extends perpendicular to this surface of the docking zone 2, is then determined depending on the type of the docking destination 5 and/or the docking zone 2 determined by said analysis, or possibly by the third determination means presented above.

Other embodiments are possible for the determination by the second determination means of the guidance trajectory of the vehicle 1 to the docking zone 2 depending on the position of the docking zone 2, itself determined by the first determination means without the use of targets 3, 4 associated with the docking zone 2. The first determination means can then determine a three-dimensional representation of the docking destination 5 and accomplishing one or more measurements in this three-dimensional representation to determine this position of the docking zone 2.

It is possible for example to use a measurement database and to compare the measurements performed with the measurements stored in this database to determine the contour of the docking zone 2 and its position relative to one or more other zones of the docking destination 5.

The present description is given by way of an example and does not limit the invention.

In particular, it is recalled that the system of the invention is not limited to the control of the docking of an airport vehicle to the door of an aircraft such as an airplane, but extends to the control of the docking of any type of vehicle to any type of aircraft, even to another vehicle or to a building.

The invention claimed is:

1. An electronic system for controlling docking of a vehicle at a given docking zone of a docking destination, the given docking zone comprising at least one target, the system comprising:
   a vision device;
   a control system coupled to the vision device configured to determine a position of the given docking zone by determining a type of the target from a set of given types and from its position;
   the control system configured to determine a guidance trajectory of the vehicle to the given docking zone depending on the type and on the position of the target; and
   the control system configured to determine the type of the docking destination, the control system determines one or more exclusion zones depending on a type of the docking destination, by comparison of the type of the docking destination with types of docking destination stored in a database in association with exclusion zones, so that the guidance trajectory of the vehicle to the given docking zone does not pass into any of the exclusion zones;
   wherein the control system determines a docking line passing through a target point situated on a surface of the given docking zone and perpendicular to the surface, so that the guidance trajectory of the vehicle to the given docking zone is terminated by a final portion of the docking line with a length greater than or equal to a predetermined threshold greater than or equal to 2 meters;
   wherein the guidance trajectory allows the vehicle to reach the target point and forms a circular arc extending from a center of a rear suspension of the vehicle to the target point, with a radius determined by a formula $(X^2+Y^2)/(2 \times Y)$, with X and Y corresponding to coordinates of the target point relative to the center of the rear suspension of the vehicle.

2. The system according to claim 1, wherein the control system determines the type of docking destination or given docking zone, or the docking destination and the given docking zone.

3. The system according to claim 1, wherein the given docking zone comprises at least two of the targets, and the target point is located at equal distances from the targets.

4. The system according to claim 1, wherein the vehicle is an airport vehicle.

5. The system according to claim 1, wherein the docking destination is an aircraft or a building.

6. The system according to claim 5, wherein the docking destination is an aircraft and the given docking zone is a door of the aircraft.

7. The system according to claim 1, wherein the control system measures an alignment between the vehicle and the given docking zone by analysis of at least a part of a profile of the docking destination, in proximity to the target, and determines point depending on the type of the docking destination or of the given docking zone, or of the docking destination and the given docking zone.

8. The system according to claim 7, wherein the docking destination is an aircraft and the control system are able to measure the alignment between the vehicle and the given docking zone by analysis of a fuselage line of the aircraft in proximity to the target.

9. The system according to claim 1, wherein the first control system determines a three-dimensional representation of the docking destination, and atoll performs one or more measurements in the three-dimensional representation, to determine the position of the given docking zone.

10. The system according to claim 9, wherein the control system compares the measurements with measurements stored in a database, and determines a contour of the given docking zone and a position relative to at least one other zone of the docking destination therefrom.

11. The system according to claim 1, wherein the control system determines size, or shape, or the size and the shape, of the target, and compares the size, respectively the shape, or the size and the shape, with sizes, respectively shapes, or sizes and shapes, stored in a database in association with types of targets also stored in said database, to a target type therefrom.

12. The system according to claim 11, wherein the control system comprise a two-dimensional vision device determining the size, or the shape, or the size and the shape, of the target and a measuring device determining a distance between the control system and the target.

13. The system according to claim 12, wherein the the measuring device comprises a three-dimensional vision device or a distance sensor.

14. The system according to claim 1, wherein the control system determines a trajectory for reaching the final portion of the docking line by adjusting the trajectory at different predetermined moments, in order, at each of the moments:
to align the rear suspension of the vehicle with the docking line when the vehicle is located at a distance greater than a given distance from the docking line;
to align a front suspension of the vehicle with the docking line when the vehicle is located at a distance less than the given distance from the docking line;
to retain the trajectory determined at a preceding moment, if a confidence level in locating the targets determined by the control system is less than a given threshold, or if the control system no longer detect the targets.

15. The system according to claim 14, wherein the control system adjusts the trajectory at each of the predetermined moments, and when the vehicle is located at a distance greater than the given distance from the docking line, by:
determining the target point on the docking line; and
defining a trajectory to allow the vehicle to reach the target point.

16. The system according to claim 15, wherein the control system determines the target point based on a longitudinal distance between the vehicle and the given docking zone, on the lateral distance between the vehicle and the docking line, and an angle ($\alpha$) between a longitudinal axis of the vehicle and the docking line.

17. The system according to claim 15, wherein the control system adjusts the trajectory at each of the predetermined moments, and when the vehicle is located at a distance less than a given distance from the docking line, by orienting wheels of the front suspension of the vehicle at an angle depending on the distance between the center of said front suspension and the docking line.

18. A vehicle, comprising wheels configured to allow movement of the vehicle by rolling, a steering guide configured to allow orienting the movement in a given direction, and the system according to claim 1, the wheels being connected by the steering guide to the control system, so as to allow the guidance of the vehicle on the trajectory determined by the control system of control system.

19. The vehicle according to claim 18, further comprising a front suspension, and the control system being connected to wheels by a steering guide so as to allow the guidance of the vehicle by control of the front suspension.

20. A method for controlling docking of a vehicle, at a given docking zone of a docking destination, the given docking zone comprising at least one target, the method comprising:
determining a position of the given docking zone by determining a type of target from a set of given types and from its position,
determining a guidance trajectory of the vehicle to the given docking zone depending on the type and depending on a position of the target; and
determining a type of the docking destination;
wherein determining the guidance trajectory comprises determining one or more exclusion zones depending on the type of the docking destination, and comparing the type of the docking destination with types of docking destinations stored in a database in association with exclusion zones, so that the guidance trajectory of the vehicle to the given docking zone does not pass into any of the exclusion zones;
wherein determining the guidance trajectory comprises determining a docking line passing through a target point situated on a surface of the given docking zone and perpendicular to this the surface so that the guidance trajectory of the vehicle to the given docking zone is terminated by a final portion of the docking line with a length greater than or equal to a predetermined threshold; and
allowing the vehicle to reach the target point using the guidance trajectory by forming a circular arc extending from a center of a rear suspension of the vehicle to the target point, with a radius determined by a formula $(X^2+Y^2)/(2 \times Y)$, with X and Y corresponding to coordinates of the target point relative to the center of the rear suspension of the vehicle.

21. The method according to claim 20 determining the position of the given docking zone comprises determining size or shape, or the size and the shape, of the target, comparing the size, respectively shape, or size and shape with the sizes, respectively shapes, or sizes and shapes, stored in a database, in association with types of target also stored in the database, to deduce the type of the target therefrom.

22. The method according to claim 20, wherein the vehicle is an airport vehicle.

23. The method according to claim 20, wherein the docking destination is an aircraft or a building.

24. The method according to claim 23, wherein the docking destination is an aircraft and the given docking zone is a door of the aircraft.

25. The method according to claim 20, wherein determining the position of the given docking zone comprises determining a three-dimensional representation of the docking destination and performing one or more measurements in the three-dimensional representation, to determine the position of the given docking zone.

26. The method according to claim 25, wherein determining the position of the given docking zone comprises comparing measurements with measurements stored in a database, to deduce from them a contour of the given docking zone and a position relative to at least one other zone of the docking destination.

27. The method according to claim 20, wherein determining the guidance trajectory comprises measuring an alignment between the vehicle and the given docking zone by analysis of at least a part of a profile of the docking destination, in proximity to the target.

28. The method according to claim 27, wherein the given docking zone comprises at least two targets, wherein the target point is located at equal distances from the targets.

29. The method according to claim 27, wherein the docking destination is an aircraft and the alignment between the vehicle and the given docking zone is measured by analysis of a fuselage line of the aircraft in proximity of the target.

30. The method according to claim 27, wherein determining the guidance trajectory comprises determining the trajectory for reaching the final portion of the docking line is by adjusting the trajectory at different predetermined moments, in order, at each of the predetermined moments:
    to align the rear suspension of the vehicle with the docking line when the vehicle is located at a distance greater than a given distance from the docking line;
    to align a front suspension of the vehicle with the docking line when the vehicle is located at a distance less than the given distance from the docking line; and
    to retain the trajectory determined at a preceding moment if a confidence level in locating the targets during determining the position of the given docking zone is less than a given threshold, or if the targets are no longer detected.

31. The method according to claim 30, wherein determining the guidance trajectory comprises, at each of the predetermined moments, and when the vehicle is located at a distance less than the given distance from the docking line, adjusting the trajectory of wheels of the front suspension of the vehicle by an angle depending on the distance between the center of the front suspension and the docking line.

32. The method according to claim 30, wherein determining the guidance trajectory comprises at each of the predetermined moments, and when the vehicle is located at a distance greater than the given distance from the docking line, adjusting the trajectory by:
    determining the target point on the docking line; and
    defining a trajectory to allow the vehicle to reach the target point.

33. The method according to claim 32, wherein determining the target point is based on a longitudinal distance between the vehicle and the given docking zone, on a lateral distance between the vehicle and the docking line, and on an angle ($\alpha$) between a longitudinal axis of the vehicle and the docking line.

34. An electronic system for controlling docking of a vehicle at a given docking zone of a docking destination, the given docking zone comprising at least one target, the system comprising:
    a vision device;
    a control system coupled to the vision device configured to determine a position of the given docking zone by determining a type of the target from a set of given types and from its position;
    the control system configured to determine a guidance trajectory of the vehicle to the given docking zone depending on the type and on the position of the target; and
    the control system configured to determine the type of the docking destination, the control system determines one or more exclusion zones depending on a type of the docking destination, by comparison of the type of the docking destination with types of docking destination stored in a database in association with exclusion zones, so that the guidance trajectory of the vehicle to the given docking zone does not pass into any of the exclusion zones;
    wherein the control system determines a trajectory for reaching a final portion of the docking line by adjusting the trajectory at different predetermined moments, in order, at each of the moments,
        to align a rear suspension of the vehicle with the docking line when the vehicle is located at a distance greater than a given distance from the docking line;
        to align a front suspension of the vehicle with the docking line when the vehicle is located at a distance less than the given distance from the docking line;
        to retain the trajectory determined at a preceding moment, if a confidence level in locating targets determined by the control system is less than a given threshold, or if the control system no longer detect the targets;
    wherein the guidance trajectory allows the vehicle to reach a target point and forms a circular arc extending from a center of the rear suspension of the vehicle to the target point, with a radius determined by a formula $(X^2+Y^2)/(2\times Y)$, with X and Y corresponding to coordinates of the target point relative to the center of the rear suspension of the vehicle.

35. A method for controlling docking of a vehicle, at a given docking zone of a docking destination, the given docking zone comprising at least one target, the method comprising:
    determining a position of the given docking zone by determining a type of target from a set of given types and from its position,
    determining a guidance trajectory of the vehicle to the given docking zone depending on the type and depending on a position of the target, and
    determining a type of the docking destination,
    wherein determining the guidance trajectory comprises determining one or more exclusion zones depending on the type of the docking destination, and comparing the type of the docking destination with types of docking destinations stored in a database in association with exclusion zones, so that the guidance trajectory of the vehicle to the given docking zone does not pass into any of the exclusion zones;
    wherein determining the guidance trajectory comprises determining the trajectory for reaching a final portion of the docking line by adjusting the trajectory at different predetermined moments, in order, at each of the predetermined moments
        to align a rear suspension of the vehicle with the docking line when the vehicle is located at a distance greater than a given distance from the docking line;
        to align a front suspension of the vehicle with the docking line when the vehicle is located at a distance less than the given distance from the docking line; and
        to retain the trajectory determined at a preceding moment if a confidence level in locating the targets during determining the position of the given docking zone is less than a given threshold, or if the targets are no longer detected; and
    further comprising allowing the vehicle to reach a target point using the guidance trajectory by forming a circular arc extending from a center of the rear suspension of the vehicle to the target point, with a radius determined by a formula $(X^2+Y^2)/(2\times Y)$, with X and Y corresponding to coordinates of the target point relative to the center of the rear suspension of the vehicle.

* * * * *